UNITED STATES PATENT OFFICE.

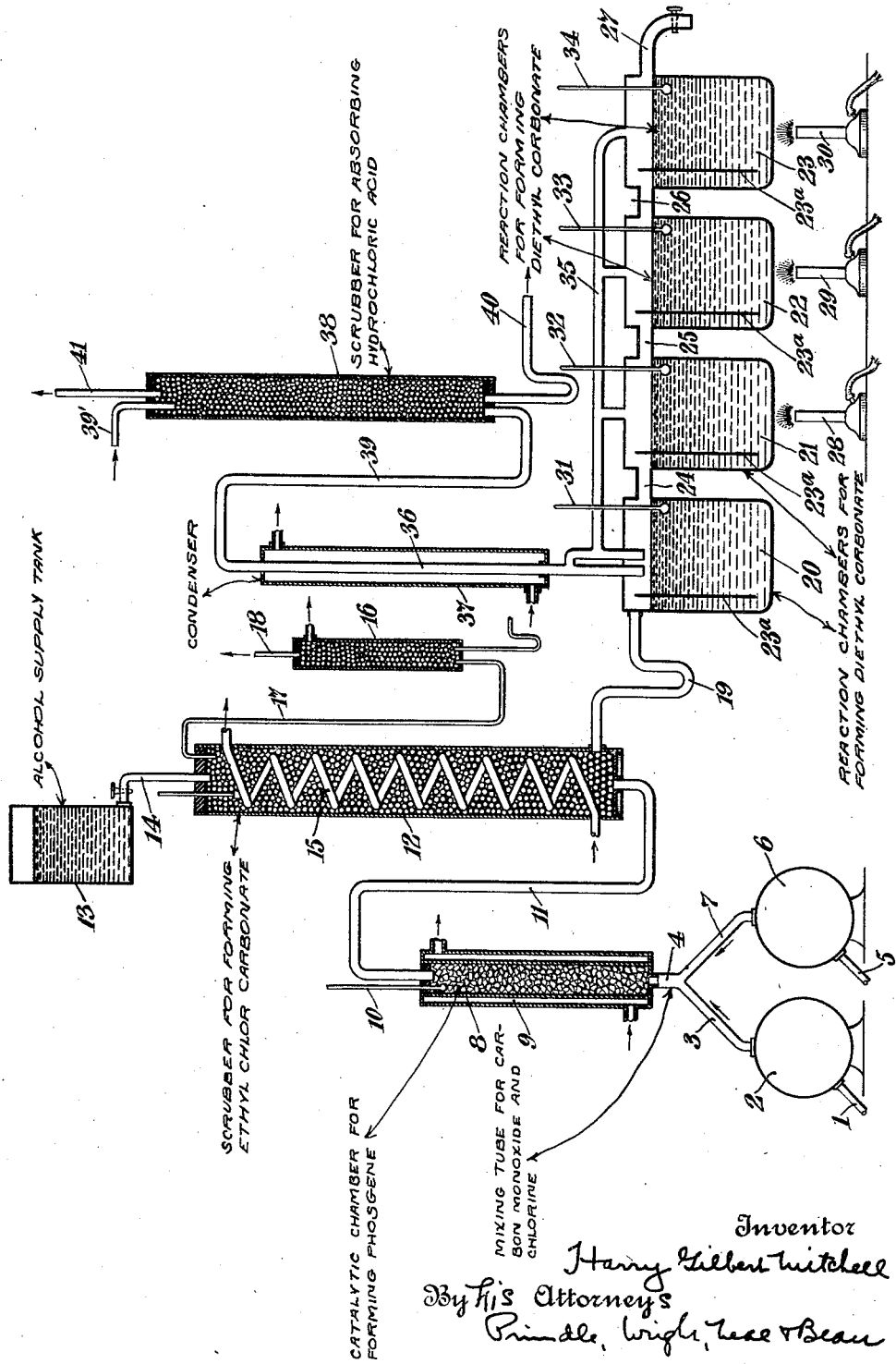

HARRY GILBERT MITCHELL, OF BALTIMORE, MARYLAND, ASSIGNOR TO U. S. INDUSTRIAL ALCOHOL CO., A CORPORATION OF WEST VIRGINIA.

METHOD OF MANUFACTURING ALKYL CARBONATES.

Original application filed July 14, 1924, Serial No. 725,835. Divided and this application filed March 26, 1925. Serial No. 18,350.

My invention relates particularly to a process for the manufacture of alkyl carbonates but especially ethyl chlorocarbonate and diethyl carbonate, which will render the manufacture of the same commercially practicable so that the said products will be available for and capable of use in the various arts. It is to be understood, however, that my process is applicable particularly to the production of alkyl carbonates which are in the same aliphatic series with diethyl carbonate.

The object of my invention is to provide a process for the production of alkyl carbonates, and particularly ethyl chlorocarbonate and diethyl carbonate, by means of which there will be a high yield, while at the same time the by-products are recovered in an effective manner, thus preventing damage which would result from the escape of the same.

Inasmuch as this is a division of my application upon manufacture of alkyl carbonates, Serial No. 725,835, filed July 14, 1924, the object of my invention is to carry out the manufacture of these products as set forth therein.

A further object is to conduct the process with the aid of phosgene gas formed from carbon monoxide and chlorine, in such a manner that the phosgene gas reacts with the alcohol at low temperatures so as to minimize side reactions and losses resulting therefrom. Another object is to bring about the separation of the diethyl carbonate from the other materials contained in the resulting reaction mixture in an advantageous manner so as to obtain high yields by avoiding distillation with consequent hydrolysis and the formation of constant boiling mixtures as far as possible.

A further object of my invention will appear from the detailed description of the same hereinafter.

The three main reactions which take place in carrying out my process are the following:

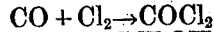
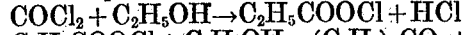

$$CO + Cl_2 \rightarrow COCl_2$$
$$COCl_2 + C_2H_5OH \rightarrow C_2H_5COOCl + HCl$$
$$C_2H_5COOCl + C_2H_5OH \rightarrow (C_2H_5)_2CO_3 + HCl$$

My invention is capable of being carried out in many different ways but I have described only certain ways of carrying out the same hereinafter and it is capable of being carried out also in connection with many different types of apparatus but by way of illustration I have shown only one type of apparatus to be used in the accompanying drawings, in which—

The figure is a diagrammatic representation of an apparatus for use in connection with my invention.

In carrying out my invention I may provide any suitable source of carbon monoxide to be supplied by a tube 1 to a storage chamber 2 and thence by a tube 3 to a mixing tube 4. However, for this purpose I prefer producer gas which would, for example, contain 25 to 40% of carbon monoxide, 60 to 65% of nitrogen and small amounts of carbon dioxide, oxygen and hydrogen. Chlorine obtained from any suitable source of supply is fed by a tube 5 to a storage chamber 6 and thence by a tube 7 to the mixing tube 4. The gases from the tubes 3 and 7 are supplied at such a rate as to mix the chlorine and carbon monoxide in the proportions of mol for mol of the two gases. In order to obtain complete utilization of the chlorine an excess of the carbon monoxide amounting to 25% above the theoretical amount, is preferred. They are thence passed through a chamber 8 filled with activated charcoal or bone-black or provided with some other appropriate catalyst. Inasmuch as the reaction is exothermic the chamber 8 is cooled by means of a water jacket 9. The temperature in the chamber 8 may be observed by means of a thermometer 10, the temperature being kept below 250° C. in order to avoid undesirable decomposition of the phosgene, although it is to be understood that in the first stage of the reaction, that is to say, the first contact between the gases, the temperature may exceed 250° C. if desired without detriment, but that preferably the final temperature of the gases upon leaving the catalytic chamber will not exceed 110° C. The gases which leave the catalytic chamber 8, and comprising phosgene, inert gases and an excess of carbon monoxide, pass out by a tube 11 to the lower end of a scrubber 12 filled with glass beads which is supplied with a descending current of absolute alcohol from a tank 13 connected to the top of the scrubber 12 by a tube 14. The amount of alcohol fed into the apparatus is preferably somewhat in excess of two mols of alcohol to one mol of phosgene. Inasmuch as the reaction in the scrubber 12 between the alcohol and the phosgene gas and which results in the production of ethyl chlorocarbonate, is exothermic, the scrubber 12 is also cooled by means of a coiled pipe 15 therein provided for the passage of cooling water so that the temperature preferably is prevented from exceeding 40° C. In order to prevent the escape of any alcohol or hydrochloric acid from the top of the scrubber, a small scrubber 16 supplied with a current of water is provided at the top of the scrubber 12 and connected thereto by means of a tube 17. A tube 18 at the top of the scrubber 16 permits any residual gases to pass out of the apparatus. The ethyl chlorocarbonate flows through a trapped tube 19 from the lower part of the scrubber 12 to a series of flasks 20, 21, 22 and 23, having baffles 23$^a$ and connected by overflow pipes 24, 25 and 26, while the flask 23 is provided with a final overflow outlet pipe 27 for the diethyl carbonate. The first flask 20 is preferably not heated as sufficient heat is provided by the contents of the flask but the other flasks 21, 22 and 23 are heated by burners 28, 29 and 30 of any desired character. The heating of the contents of these flasks is carried out preferably in a period of from 4 to 5 hours and until the temperature reaches 82 to 85° C., which is the final boiling point of the mixture, the temperature being observed by means of thermometers 31, 32, 33 and 34 contained in these flasks. Any vapors formed in the flasks and which would contain alcohol and hydrochloric acid, are conveyed by a tube 25, connected to the top of the flasks 21, 22 and 23, to a reflux condenser 36 having a water cooling jacket 37 and the large amount of hydrochloric acid present is finally collected in a scrubber 38 connected by a tube 39 to the top of the condenser 36, the scrubber being filled with glass beads and supplied with a current of water 39' for the absorption of the hydrochloric acid which passes out from the lower end of the scrubber through a trapped pipe 40 and the residual gases escape from the top of the scrubber by means of a tube 41.

The diethyl carbonate coming from the tube 27 is then treated in such a way as to remove the impurities therefrom. This is preferably done by adding to the solution containing diethyl carbonate flowing from the tube 27, a neutralizing agent, such, for example, as a solution of caustic potash in water, but preferably a 30% strength caustic soda solution in water, the water being added in this way in such quantity as to make the solution neutral or slightly alkaline, and containing sufficient water to dissolve any precipitated sodium chloride. Preferably to counteract the heat of neutralization and to avoid hydrolysis of the diethyl carbonate due to increased temperatures, the mixture is cooled to from 10 to 30° C. during the neutralization and is agitated. The mixture is then allowed to separate into two layers, an upper ester layer containing approximately 80% diethyl carbonate and 20% alcohol, with slight impurities, and a lower layer which is comprised almost entirely of a sodium chloride solution in water. The upper layer may then be decanted and, if desired, separated into its constituents by rectification.

The above process may be modified somewhat, if desired, by changing the same to the extent of introducing with the phosgene an amount of the alcohol equal to 100% in excess of the amount theoretically required to form the diethyl carbonate. This procedure is, in fact, preferred inasmuch as when such an excess of alcohol is present the conversion of the ethyl chlorocarbonate to diethyl carbonate proceeds at room temperatures and is completed in about 48 hours without requiring the application of heat at this stage of the process, and as when conducting the process in this manner most of the hydrochloric acid is retained in the liquid.

Furthermore, in the purification of the final product, whether or not the 100% excess of alcohol has been introduced, the diethyl carbonate may be separated from the materials dissolved therein without previous neutralization, if desired, by the addition of water which will cause a separation of the liquid into two layers. For this purpose generally an amount of water is added equal to from 3 to 5 times the volume of the diethyl carbonate solution, the amount of water, however, depending upon the concentration of the ester solution and being added in an amount sufficient to reduce the concentration of the alcohol solution formed to such a point that the ester will be most effectively carried into the upper layer and the hydrochloric acid completely retained by the lower layer. That is to say, the alcohol obtained from the ester and alcohol solution will be reduced in this way to a 10% solution of alcohol and water in the lower layer when sufficient water has been added.

Again, if desired, instead the ester and alcohol solution coming from the tube 27 may be purified with the aid of inert solvents including aromatic hydrocarbon solvents, such, for example, as benzol, toluol or xylol and aliphatic ethers such as ethyl ether, propyl ether, ethyl methyl ether, etc.

When sufficient of the inert solvent has been added to completely dissolve the diethyl carbonate, water is then added in sufficient quantity to make a complete separation of the constituents into two layers. It will be understood, furthermore, that the quantity of the inert solvent which is used will be such as to change the distribution of the ester in the mixture as to cause a separation to take place, forming an upper layer of ester and solvent solution containing all of the ester and a lower layer of dilute alcohol containing the hydrochloric acid. It is desirable, therefore, that the solvent used shall be a solvent for the alkyl carbonate, that the solution of the ester in the solvent be insoluble in water and dilute alcohol solutions, that the solvent be readily separable from the ester, that the hydrochloric acid be insoluble in the solvent and that the solvent be inexpensive and readily recoverable, although it is to be understood that the solvents to be used need not have all these characteristics.

While I have described my invention above in detail I wish it to be understood that many changes may be made therein without departing from the spirit of the same.

I claim:

1. The process which comprises bringing the vapors of phosgene into contact with an aliphatic alcohol in an excess amounting to approximately 100% above the theoretical quantity required to form a dialkyl carbonate and allowing the reaction mixture to stand until a dialkyl carbonate is formed.

2. The process which comprises bringing the vapors of phosgene into contact with alcohol in an excess amounting to approximately 100% above the theoretical quantity required to form diethyl carbonate and allowing the reaction mixture to stand until diethyl carbonate is formed.

3. The process which comprises forming a dialkyl carbonate in a reaction mixture containing an aliphatic alcohol and phosgene in the absence of an acid binding agent, adding an inert solvent for the dialkyl carbonate—which in the presence of water acts as a non-solvent for the alcohol layer formed—to the reaction mixture, adding water thereto in a quantity sufficient to form separate liquid layers and removing the layer containing the larger percentage of dialkyl carbonate.

4. The process which comprises forming diethyl carbonate in a reaction mixture containing alcohol and phosgene in the absence of an acid binding agent, adding an inert solvent for the diethyl carbonate—which in the presence of water acts as a non-solvent for the alcohol layer formed—to the reaction mixture, adding water thereto in a quantity sufficient to form separate liquid layers and removing the layer containing the larger percentage of diethyl carbonate.

5. The process which comprises forming a dialkyl carbonate in a reaction mixture containing an aliphatic alcohol and phosgene in the absence of an acid binding agent, adding benzol as an inert solvent to the reaction mixture, adding water thereto in a quantity sufficient to form separate liquid layers and removing the layer containing the larger percentage of dialkyl carbonate.

6. The process which comprises forming diethyl carbonate in a reaction mixture containing alcohol and phosgene in the absence of an acid binding agent, adding benzol as an inert solvent to the reaction mixture, adding water thereto in a quantity sufficient to form separate liquid layers and removing the layer containing the larger percentage of diethyl carbonate.

7. The process which comprises forming a dialkyl carbonate in a reaction mixture containing an aliphatic alcohol and phosgene in the absence of an acid binding agent, adding an inert solvent for the dialkyl carbonate—which in the presence of water acts as a non-solvent for the alcohol layer formed—to the reaction mixture, adding water thereto in a quantity sufficient to form separate liquid layers, removing the layer containing the larger percentage of dialkyl carbonate and distilling the layer containing the larger percentage of the ester formed to separate the solvent therefrom.

8. The process which comprises forming diethyl carbonate in a reaction mixture containing alcohol and phosgene in the absence of an acid binding agent, adding an inert solvent for the diethyl carbonate—which in the presence of water acts as a non-solvent for the alcohol layer formed—to the reaction mixture, adding water thereto in a quantity sufficient to form separate liquid layers, removing the layer containing the larger percentage of diethyl carbonate and distilling the layer containing the larger percentage of the ester formed to separate the solvent therefrom.

9. The process which comprises forming a dialkyl carbonate in a reaction mixture containing an aliphatic alcohol and phosgene in the absence of an acid binding agent, adding benzol as an inert solvent to the reaction mixture, adding water thereto in a quantity sufficient to form separate liquid layers, removing the layer containing the larger percentage of dialkyl carbonate and distilling the layer containing the larger percentage of the ester formed to separate the solvent therefrom.

10. The process which comprises forming diethyl carbonate in a reaction mixture containing alcohol and phosgene in the absence of an acid binding agent, adding benzol as an inert solvent to the reaction mixture, adding water thereto in a quantity sufficient to form separate liquid layers, removing the layer containing the larger percentage of diethyl carbonate and distilling the layer containing the larger percentage of the ester formed to separate the solvent therefrom.

In testimony that I claim the foregoing, I have hereunto set my hand this 20th day of March, 1925.

HARRY GILBERT MITCHELL.